United States Patent [19]

Anderka et al.

[11] 4,097,874

[45] Jun. 27, 1978

[54] BLOCKING ASSEMBLY FOR AN AUTOMATIC DRAFTING DEVICE

[75] Inventors: Gerold Anderka, Ellerbek; Horst Hampel, Bonningstedt; Walter Jozat, Bad Bramstedt; Klaus Straszewski, Quickborn, all of Germany

[73] Assignee: Mesne Koh-I-Noor Rapidograph, Inc., Bloomsbury, N.J.

[21] Appl. No.: 793,447

[22] Filed: May 3, 1977

Related U.S. Application Data

[63] Continuation-in-part of Ser. No. 781,394, Mar. 25, 1977.

[30] Foreign Application Priority Data

Feb. 19, 1977  Germany ............................ 2707258

[51] Int. Cl.[2] .......................................... G01D 15/16
[52] U.S. Cl. .................................. 346/140 R; 346/141
[58] Field of Search ................ 346/140 R, 140 A, 141

[56] References Cited

U.S. PATENT DOCUMENTS

| | | | |
|---|---|---|---|
| 1,766,249 | 6/1930 | Finch | 178/96 X |
| 2,926,058 | 2/1960 | Phillips, Jr. | 346/111 |
| 3,346,869 | 10/1967 | Stone | 346/140 R X |
| 3,824,603 | 7/1974 | Bates et al. | 346/140 R X |
| 3,839,721 | 10/1974 | Chen et al. | 346/140 R X |
| 3,864,695 | 2/1975 | Nagashima et al. | 346/140 R X |
| 3,945,734 | 3/1976 | Woodbridge | 401/108 X |
| 3,963,337 | 12/1960 | Spalck | 346/140 R |

*Primary Examiner*—George H. Miller, Jr.
*Attorney, Agent, or Firm*—David H. Semmes

[57] ABSTRACT

Automatic drafting device of the type employing a tubular writing pen, particularly an adjustable sealing element which is used against the writing tip of the pen when the pen is in a retracted rest mode. The sealing element is laterally disengaged from the pen tip when the pen is an extended writing mode. The sealing element which may be in the form of an elastic spheroid prevents drying out of ink within the capillary channel when the pen is not in use. The blocking assembly is characterized by its ability both to lock the tubular writing pen in its rest position and to lock the sealing element in its laterally outward position so as to avoid interference with the pen during temporary moments of non-writing.

17 Claims, 8 Drawing Figures

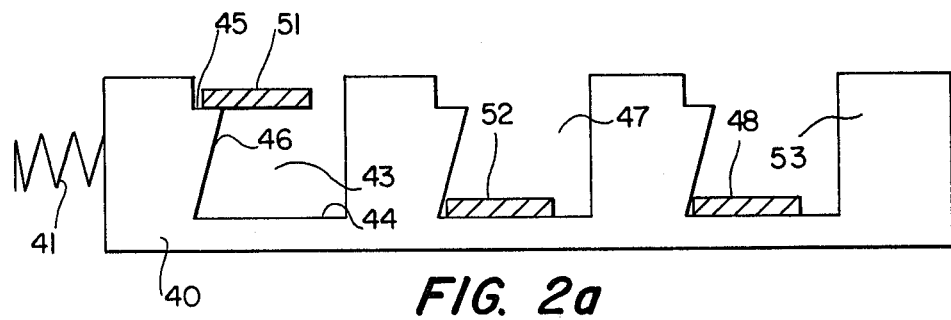
FIG. 2a
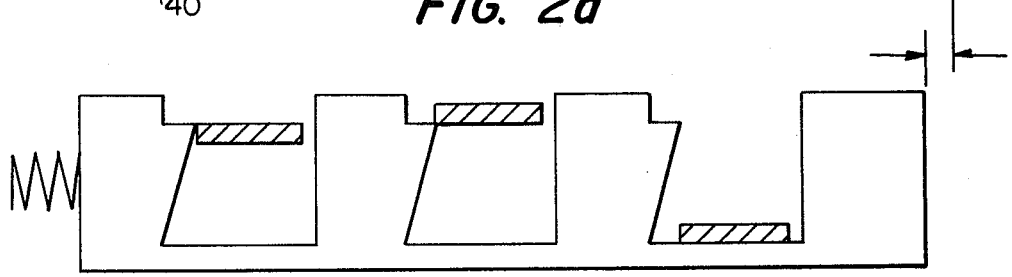
FIG. 2b
FIG. 2c
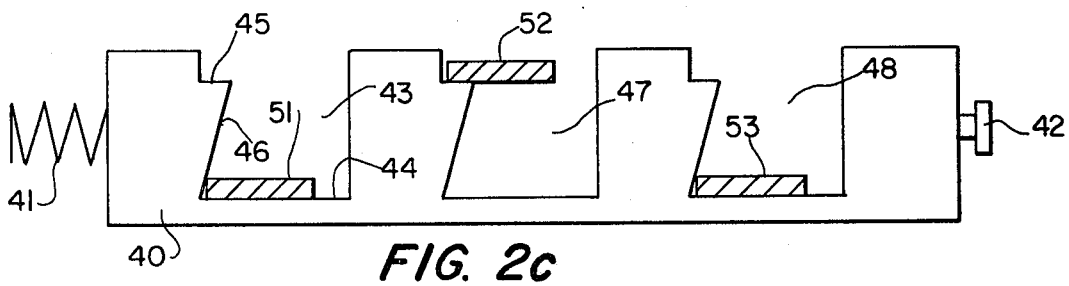
FIG. 2d
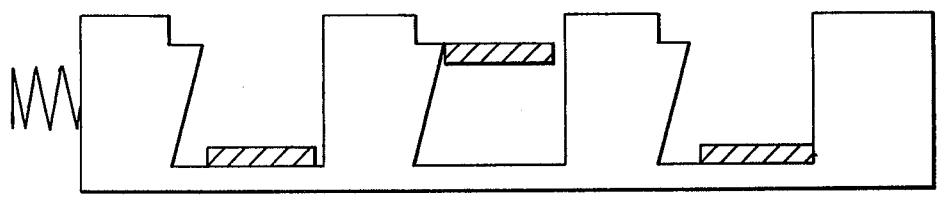
FIG. 2e
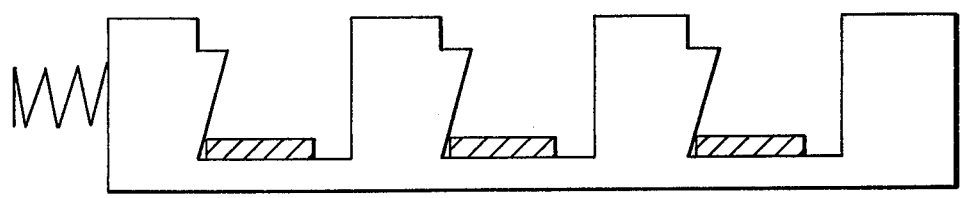

BLOCKING ASSEMBLY FOR AN AUTOMATIC DRAFTING DEVICE

CROSS-REFERENCE TO RELATED APPLICATIONS

A continuation-in-part and improvement upon the earlier filed application AUTOMATIC DRAFTING DEVICE (Ser. No. 781,394), filed Mar. 28, 1977.

BACKGROUND OF THE INVENTION (1) Field of the Invention

Automatic drafting instruments of the type supporting one or more tubular writing pens in either a lowered writing position with the pen tip contacting the writing surface or an upper rest position with the pen tip out of contact with the writing surface. A problem encountered in such mechanisms is drying of ink within the pen tip when the tubular writing pen is in the retracted or rest mode. As a result of the drying ink, such a pen when returned to the lowered writing mode will draft irregular width lines during initial operation.

(2) Description of the Prior Arts:

|  |  |
|---|---|
| FINCH | 1,766,249 |
| PHILLIPS | 2,926,058 |
| SPALEK | 2,963,337 |
| STONE | 2,346,869 |
| BATES | 3,824,603 |
| CHEN | 3,839,271 |
| NAGASHIMA | 3,864,695 |
| WOODBRIDGE | 3,945,734 |

The above-listed patents are described in the parent application.

SUMMARY OF THE INVENTION

The invention deals with an automatic drawing device supporting at least one tubular pen within a drawing housing. The tubular pen may be supported in a raised-up, rest position, in which the forward end of the writing-tube is above the drawing surface, and may be lowered into a drawing position, in which the forward end of the writing-tube is in contact with the drawing surface. A sealing-element closes off and seals the forward end of the writing-tube when it is in the raised or rest position, and is moved laterally away with respect to the writing-tube when the tubular pen is in the drawing position, according to the parent application West German Ser. No. P 26 13 440.7.

In the drawing device according to the parent application a sealing of the writing-tube, when the tubular pen is in the raised or rest position, is achieved by means of a sealing-element, which during drafting with the tubular pen is moved laterally away with respect to the writing-tube so that the drawing process is not impeded. Through the use of this sealing-element, it is ensured that the tubular pen, even after a prolonged period of time in the raised or rest position, will always be ready to draw, such that the automatic operation of the drawing device is not hindered.

In conventional drawing devices, the sealing-element and consequently even the writing-tubes can be damaged for very small line widths when the sealing-element, which is in contact with the writing-tube, is moved laterally both to terminate the sealing action and to allow the tubular pen to descend into the drawing position, since the forward end of the writing-tube is in contact with the surface of the sealing-element during the first stage of its lateral motion.

To eliminate these difficulties, the drawing device in the parent application is modified with a blocking assembly which engages the tubular pen in order to maintain the tubular pen in its raised or rest position until the lateral movement of the sealing element outwardly of the descent range of the tubular pen has been completed. That is, the blocking assembly enables a lateral movement of the sealing element out of its sealing position without the forward end of the writing tube coming into contact with the sealing element during this lateral movement. This lateral movement absent contact with the pen eliminates the force upon the sealing element corresponding to the weight of the tubular pen and possibly the existing springs.

With a drawing device designed in this manner, in which the tubular pen can be moved by means of a solenoid between the raised or rest position and the lowered drafting position, and in which the sealing element is connected to a laterally moving lever fastened to the drawing housing by means of a solenoid, the blocking assembly may consist of an auxiliary lever designed to adjoin a main lever which engages the writing tube. After the sealing element, which engages the tubular pen essentially in the rest position, is freed of the forward end of the writing tube, the main lever will engage the auxiliary lever and, after the main lever moves laterally for a given distance while engaging the auxiliary lever, the auxiliary lever will be disengaged from the tubular pen.

In the drawing device according to the parent application, with every descent of the tubular pen there ensues a lateral movement of the sealing element outwardly of the vicinity of the writing tube, as well as a corresponding reverse or lateral inward movement when the tubular pen is raised in order to seal off the writing tube. These lateral movements also take place when the tubular pen is raised merely to interrupt the drawing of the line and then immediately dropped back onto the drawing basis as in the case of drafting with a dotted line. For such a drawing sequence, therefore, it is not necessary to seal off the writing tube since there is no danger that the ink will dry out in the very short time span in which the tubular pen will be drawn back into its rest position.

The drawing device can therefore be designed, such that the sealing element can be fixed in the laterally outward position whereby the tubular pen can be moved back and forth between the lowered drawing position and the raised rest position without the writing tube being sealed off while in the respective rest position.

To arrest the sealing element in a drawing device of the above-mentioned type, a reciprocable guide plate can be provided which will have a perforation or recess for the main lever and which can be shifted perpendicularly to the longitudinal extension of the lever, as well as perpendicularly to the direction of its swing and by which the main lever in the sealing position rests upon the base of the perforation or recess and in the laterally rotated final position rests upon a shoulder or projection which lies at an interval from the base in the direction of the lateral movement of the lever.

Thus in a design of this type, the lever through the lateral movement in its final position and a corresponding shift of the guide plate can be brought to a support position upon the shoulder or inward projection — whereby the sealing element will be reversed through a corresponding movement of both the guide plate and of the lever to a position upon the base of the perforation or recess.

The movement of the guide plate can be carried out manually by the operator. It is, however, also possible to connect the guide plate to a solenoid, or something similar, which will allow the sliding motion to be carried out by the solenoid in accordance with the desired method of operation. In this way, a time-control can be provided which after a certain time interval will move the guide plate, so that the sealing element returns to its sealing position and seals the writing tube. This time interval can be chosen so that the sealing will take place then when the tubular pen has not descended into the drawing position for a certain length of time which would presume that the tubular pen was not lifted solely to attain an interruption in the progress of the line. This time interval lies therefore, for example, in the range of from 15 to 30 seconds.

To determine the time interval and the subsequent release of the solenoid, among other things, a mechanical or electrical timing circuit of common design can be used, for example. It is also possible, with the drawing device being guided by means of a program, perhaps a perforated tape program, that the corresponding steering of the solenoid, among other things, after the time interval is terminated, can be taken care of within the program.

With the lateral movement of the lever, in order to achieve an automatic shifting of the guide plate through which a simultaneous, separate activation of the guide plate either by hand or by means of a solenoid or other can be avoided, the surface lying between the base and the shoulder or projection can be inclined in the direction of the lateral movement, and the lever can be brought into contact with the inclined surface during the lateral movement of the sealing element, so that the lever moves the guide plate through engagement with the inclined surface in the above manner, and the guide plate merely needs to be returned a corresponding amount when the lever is in the vicinity of the shoulder or projection in order that an arrest of the lever be accomplished.

Preferably the movement of the guide plate from its initial position will take place against spring power, so that the arrest of the lever by means of the shoulder or projection will automatically occur at the corresponding position of the lever.

The appropriate design of the drawing device can obviously also be equipped with a recorder head which has a plurality of tubular pens, as well as their associated sealing elements. In this case the guide plate is equipped with a perforation or recess for each tubular pen to receive the respective lever.

BRIEF DESCRIPTION OF THE DRAWINGS

FIGS. 2a and 2e schematically depict a guide plate for a drawing head with three tubular pens; the guide plate has three recesses through which the main and auxiliary levers extend, carrying the sealing elements for the tubular pens.

DESCRIPTION OF THE PREFERRED EMBODIMENTS

Figure 1:
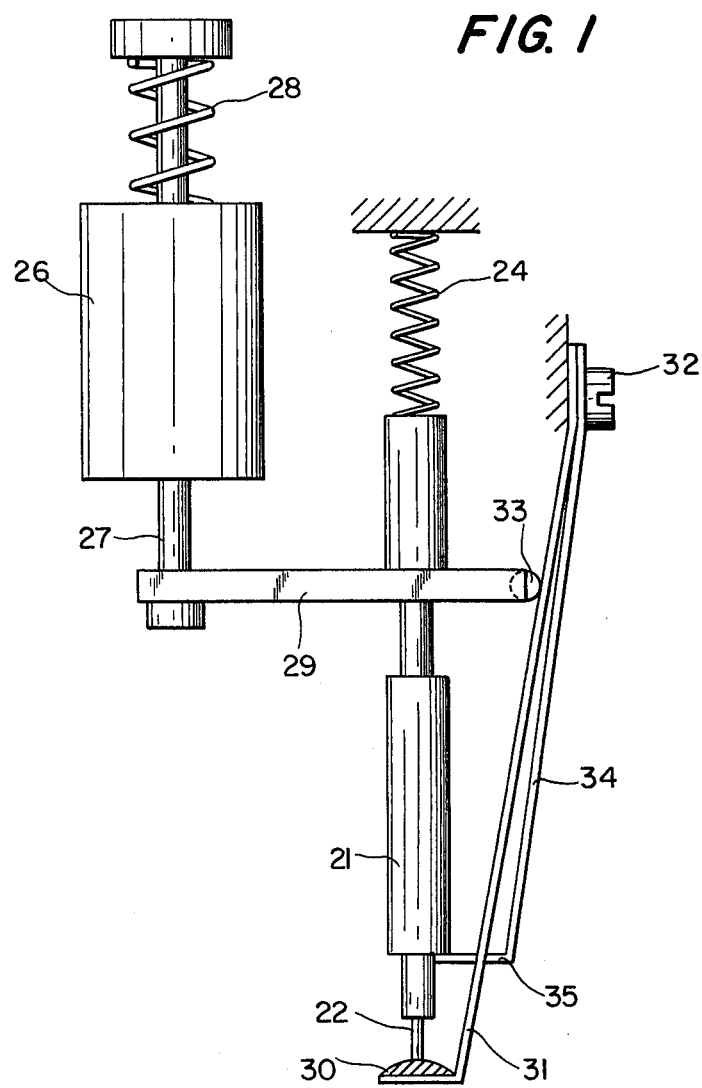
FIG. 1 schematically depicts a lateral view of a tubular pen with a laterally movable sealing element as well as the solenoid which causes the lateral movement.

The arrangement represented in FIG. 1 is part of a drawing housing which is not depicted, i.e., the tubular pen 21 with the writing tube 22 can be moved vertically between a raised-up or rest position, depicted in the figure, and a lowered or drawing position. To carry out this movement, adjacent to the tubular pen a solenoid 26 is provided which has a piston 27 which moves downwardly against the force of spring 28 when solenoid 26 is charged. Piston 27 has a cross-pin 29 upon which rests upon tubular pen 21 with a ring collar, as is depicted, so that spring 24, which is anchored to a stationary point on the writing head and is engaged with the tubular pen 21, is not able to pull the tubular pen downwards as long as solenoid 26 is not charged.

Also attached to the writing head by means of a screw 32, is a spring lever 31 which extends obliquely from the forward end of the tubular pen 21. Spring lever 21 carries a sealing element 30 on its lower end which consists of an elastic material, sealing off the writing tube 22 of tubular pen 21 when it is in the lowered or rest position. Further, attached to the drawing head by means of a screw 32 is an auxiliary spring lever 34 whose vertical inclination is less than that of the lever 31 and whose horizontally extending lowermost portion 35 passes through an unrepresented opening in the lever 31 and extends into the area of a ring collar or ledge of tubular pen 21.

Should tubular pen 21 be moved downwardly into its drawing position, solenoid 26 will thus be charged and its activating piston 27 will move downwards whereby roller 33, which is fixed to the free end of the cross-pin 29, will move lever 31 laterally outwardly so that the sealing element 30 will come away from writing tube 22. Altough cross-pin 29 moves in a downward direction spring 24, for the time being, cannot move the tubular pen 21 outs of its rest position, since the lowermost portion 35 of auxiliary lever 34 maintains the tubular pen in the raised-up position through engagement with the corresponding ring collar.

Only after a certain lateral movement of lever 31 as a result of the downward movement of the cross-pin 29, lever 31 will lie against the auxiliary lever 34, so that the auxiliary lever will be shifted laterally outwardly with further downward motion of the activation piston 27 and with it roller 33, together with the lever 31, whereby the lowermost portion 35 of the auxiliary lever 34 will release the tubular pen. With this release, the sealing element 30 will already be outside of the vicinity of the writing tube 22, and the tubular pen at this time will move downwards into the drawing position due to the force and action of spring 24.

When current is not flowing through the solenoid 26, the tubular pen will return through the force of spring 28 to its rest position in which the sealing element 30 seals off writing tube 22.

Figure 3A:
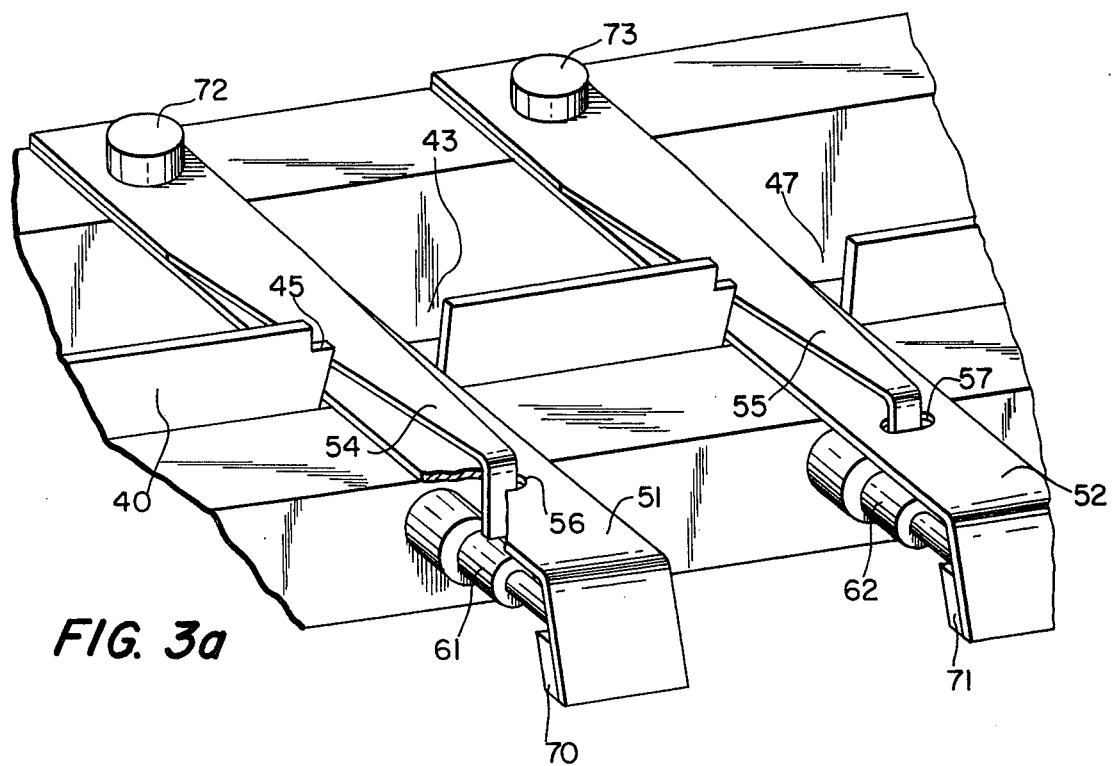
FIGS. 3a and 3b depict, in a perspective partial representation with an inverted oblique view, two tubular pens arranged in the writing head, according to FIGS. 2a–2e, with their associated sealing elements attached to the main levers and the auxiliary levers extending through the main lever to engage the tubular, writing pen.

In FIGS. 2a–2d, a possibility is shown how the lever carrying the sealing element may be arrested in the laterally shifted position making it possible to move the tubular pen out of the rest position without the seaing element engaging the writing tube of the tubular pen; the writing head from which it derives has three tubular pens, as in FIG. 3a, which have levers 51, 52, and 53, respectively, to hold identical sealing elements 70, 71.

As can be readily seen, levers 51, 52, and 53 are drawn simply in cross section in the schematics according to FIGS. 2a and 2e. There levers may be moved through recesses 43, 47, and 48 perpendicular to the lengthwise extension of the levers and perpendicular to the direction of these levers moving laterally, namely, in the figures represented, from left to right and vice-versa.

The representation in FIG. 2a depicts the operating condition, as it occurs when the tubular pen is in drawing operation with lever 51. In this position, lever 51 is raised up from base 44 of recess 43 and rests upon a projection 45 which has an inclining surface 46 between it and the base 44. Since recesses 47 and 48 have the same profile as recess 43, they will not be further described below as illustrated in FIGS. 2a. Levers 52 and 53 in recesses 47 and 48 lie upon the base of these recesses so that their associated tubular pens are sealed off.

Now if the tubular pen belonging to lever 52 is put into drawing operation instead of the tubular pen associated with lever 51, then the tubular pen associated with lever 51 will be raised-up into its rest position and lever 52 will be laterally moved in the above described fashion so that it will glide along the inclined surface of the recess 47 and thereby shove the slide plate 40 against the force of the spring 41 to the left for the distance indicated between FIGS. 2a and 2b.

This displacement will suffice to release the lever 51 from the projection 45 so that as the result of its resilience it will swing back to base 44 and make the sealing element connected to it engage the writing tips of its tubular pen. Apart from this, since lever 52 will be raised-up into the vicinity of the inward projection of recess 47, slide plate 40 can return to its initial position due to spring 41 power: and the arrangement according to FIG. 2c, in which the lever 52 is arrested, takes place so that the tubular pen connected to it can be moved between the drawing position and the rest position without movement of the corresponding sealing element.

If all of the tubular pens are brought into the rest position and sealed off there, it is only necessary to push the slide plate 40 to the left out of its position according to FIG. 2c by manually pressing button 42. Thereby the lever 52 is released from the inward projection in recess 47 and due to its elasticity comes to rest on the base of this recess whereupon the slide plate 40 returns to its original position due to the compression of spring 41, and the situation in FIG. 2e occurs, i.e., all of the tubular pens of the writing head are sealed off by means of sealing elements.

As previously stated, the displacement of slide plate 40 to seal off the tubular pens can also be carried out by means of a solenoid and, above all, this movement can be effected, if none of the tubular pens is lowered into the drawing position for a previously determined length of time. It is only necessary to establish the desired time interval by means of a mechanical or electrical timing circuit so that after this time period has passed without a tubular pen being lowered into the drawing position, the slide plate will be moved through the activation of a corresponding solenoid which directly or indirectly engages slide plate 40.

Figure 3B:
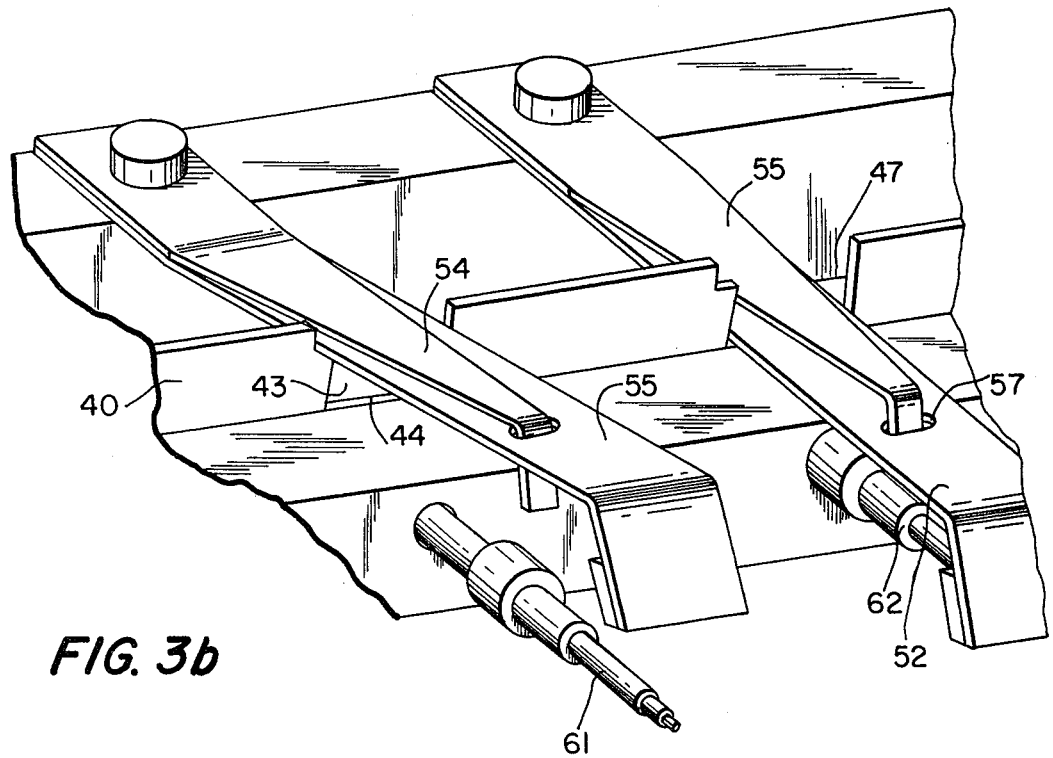

Further details of the arresting assembly are shown in FIGS. 3a and 3b where only the levers 51 and 52, identifiable in FIGS. 2a through 2e, are shown with their associated tubular pens 61 and 62 and auxiliary levers, 54 and 55.

As can be seen, levers 51 and 52, which carry sealing elements 70 and 71 for tubular pens 61 and 62, are fastened to the writing head by means of set screws 72 and 73 and, moreover, the auxiliary levers 54 and 55 are also secured to the writing head by means of these set screws. The lowermost portions of these auxiliary levers 54 and 55 extend through openings 56 and 57 in levers 51 and 52 and engage collars of their respective tubular pens 61 and 62 when levers 51 and 52 are not in the laterally shifted position. This engagement is indicated through the exploded view in FIG. 3a and was described in connection with FIG. 1 for the auxiliary lever 34.

As already shown in FIGS. 2a through 2e, lever 51 stretches through the recess 43 and lever 52 through the recess 47 of slide plate 40 whereby the position of the lever according to FIG. 3a corresponds to the position of the lever in FIG. 2e, and the position of the lever according to FIG. 3b corresponds to the position of the lever from FIG. 2a. That is, in FIG. 3b lever 51 is arrested by being positioned upon the inward projection of recess 43, so that tubular pen 61 can be moved back and forth between the drawing position and the rest position without the writing tube being sealed off by its sealing element 70.

We claim:

1. In an automatic drafting device of the type adjustably supporting a tubular writing pen with writing tip in both a lowered writing position with the pen tip contacting the writing surface and a raised rest position with the pen tip out of contact with the writing surface, the improvement comprising:
   A. A housing support for said tubular pen;
   B. A rest mode mechanism mounted upon said housing and engaging said pen, so as to urge said pen inwardly of said housing into a raised rest position;
   C. A writing mode mechanism mounted upon said housing and engaging said pen, so as to urge said pen outwardly of said housing in a lowered writing position; and
   D. A sealing element supported upon said housing, so as to engage the writing tip of said pen in the raised rest position and so as to disengage laterally from the writing tip in a lowered writing position, and
   E. A reciprocable blocking assembly supported in said housing and engaging said sealing element as an override to prevent axial movement of said tubular pen, such that said sealing element is moved laterally outwardly of said tubular pen during pre-selected periods.

2. The improvement in an automatic drafting device as in claim 1, wherein said sealing element is mounted upon a flexible, axially extending lever.

3. The improvement in an automatic drafting device as in claim 2, including:
   F. Cam means supported in said housing so as to abut said axially extending lever and, thereby, laterally disengage said sealing element from the writing tip, as said tubular pen is lowered into writing position.

4. The improvement in an automatic drafting device as in claim 3. said cam being affixed to said solenoid plunger and extending radially outwardly of said housing to engage said axially extending lever.

5. The improvement in an automatic drafting device as in claim 3, said rest mode mechanism including a spring override encircling said tubular pen within said housing and abutting an upper end of said pen, so as to urge said pen inwardly of said housing.

6. The improvement in an automatic drafting device as in claim 5, including:
   G. A plunger mechanism supported within said housing and operably engaging said tubular writing pen, so as to urge said pen outwardly of said housing in a lowered writing position.

7. The improvement in an automatic drafting device as in claim 6, said flexible axially extending lever being mounted at one end on the side of said housing and extending substantially axially towards said writing tip, so as to urge said sealing element against said writing tip, as said tubular pen is withdrawn into said housing.

8. The improvement in an automatic drafting device as in claim 7, said plunger being in the form of an electrically energized solenoid.

9. The improvement in an automatic drafting device as in claim 8, including an auxiliary spring override urging said solenoid plunger downwardly to engage said tubular pen and to lower said writing pen tip into writing position.

10. The improvement in an automatic drafting device as in claim 7, wherein said sealing element is an elastic of spherical configuration.

11. The improvement in an automatic drafting device as in claim 10, wherein said blocking assembly engages both said sealing element and said tubular pen, so as to block said pen in its raised rest position until said sealing element is disengaged from the writing tip.

12. The improvement in an automatic drafting device as in claim 11, said blocking assembly further including:
   (a) a laterally reciprocable guide plate,
   (b) an axially extending main lever supporting said sealing element, and
   (c) an axially extending auxiliary lever juxtaposed with respect to said main lever and engaging said tubular pen.

13. The improvement in an automatic drafting device as in claim 12, wherein a plurality of writing pens each with its respective main lever and auxiliary lever medially engage respective apertures in said guide plate.

14. The improvement in an automatic drafting device as in claim 12, said auxiliary lever extending radially inwardly through an aperture in said main lever so as to engage a side of said tubular pen.

15. The improvement in an automatic drafing device as in claim 14, said guide plate including an irregularly projected aperture engaging a medial portion of said main lever and said auxiliary lever, such that said sealing element may be arrested in its position of lateral disengagement from said pen.

16. The improvement in an automatic drafting device as in claim 15, said guide plate aperture engaging said main lever and said auxiliary lever in plural attitude of lateral and vertical support both to retain said auxiliary lever against said pen and to retain said sealing element against said tubular pen and to disengage said auxiliary lever from said pen and to disengage said element from said pen tip.

17. The improvement in an automatic drafting device as in claim 16, said guide plate being spring urged.

* * * * *